Patented June 13, 1933

1,913,798

UNITED STATES PATENT OFFICE

WILHELM ECKERT, HEINRICH SIEBER, AND HEINRICH GREUNE, OF FRANKFORT-ON-THE-MAIN-HOCHST, AND GERHARD LANGBEIN, OF HOFHEIM IN TAUNUS, GERMANY, ASSIGNORS TO GENERAL ANILINE WORKS, INC., OF NEW YORK, N. Y., A CORPORATION OF DELAWARE

CYCLIC KETONES OF THE ACENAPHTHENE SERIES AND PROCESS OF PREPARING THEM

No Drawing. Application filed August 27, 1930, Serial No. 478,311, and in Germany September 25, 1929.

The present invention relates to cyclic ketones of the acenaphthene series and process of preparing them.

We have found that cyclic ketones of the acenaphthene series of the following probable formula

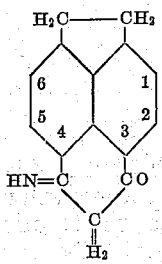

wherein the naphthalene nucleus may contain substituents are obtained by causing aluminium chloride to act upon a compound of the following formula wherein the naphthalene nucleus may contain substituents.

The reaction is preferably carried out in the presence of a diluent such, for instance, as chlorobenzene, tetrachloroethane, sodium chloride or other inorganic salts and at temperatures between about 110° C. and about 160° C. In the most cases the new products are obtained in form of their salts such, for instance, as the hydrochloride or the sulfates. By treating these salts with, for instance, alkali metal-hydroxide the corresponding bases are obtained in a free state.

The cyano-acetyl acenaphthenes used as starting materials may, for instance, be obtained according to the process described in the copending U. S. Patent application Serial No. 478,310 for "substitution products of aromatic compounds and process of preparing them" in the name of Wilhelm Eckert, Heinrich Sieber and Heinrich Greune.

The new cyclic ketones are valuable intermediate products for the manufacture of vat dyestuffs.

In order to prepare the new cyclic ketones it is sometimes unnecessary to isolate the cyano-acetyl acenaphthenes used as starting materials. It is rather possible to prepare these cyclic ketones of acenaphthene or its derivatives by condensation of cyano-acetyl chloride with acenaphthene or a derivative thereof and transformation of the condensation products into the corresponding cyclic ketones by means of an aluminum chloride in a single operation, if these reactions are carried out in an indifferent solvent, as, for instance, tetrachloro-ethane.

This procedure simplifies the process hitherto known.

The following examples serve to illustrate the invention, but they are not intended to limit it thereto, the parts are by weight:

(1) 10 parts of the product of the following formula obtainable from cyano-acetyl chloride and acenaphthene by the process of the said application Serial No. 478,310, are introduced little by little into a mixture of 40 parts of aluminium chloride and 10 parts of sodium chloride heated to 130° C. After 10 minutes the reaction is finished. The melt is allowed to cool and then ice and hydrochloric acid are added thereto and the hydrochloride of the cyclic ketone is filtered by suction. It is a yellowish-brown powder which dissolves in concentrated sulfuric acid to a yellow solution which has a strong green fluorescence. It melts at above 300° C.

By treating the aqueous solution with an alkali, the free base of the following probable formula

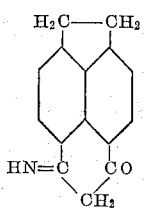

separates. It crystallizes from chloro-benzene in the form of yellow prisms.

(2) 50 parts of the said product from cyano-acetyl chloride and acenaphthene are melted together with 200 parts of aluminium chloride at a temperature of about 140° C. After 5–10 minutes the melt is poured into ice water, filtered by suction and washed until neutral. The cyclic ketone is obtained with the same yield and purity as by the process of Example 1.

(3) 15 parts of the said product from cyano-acetyl chloride and acenaphthene are dissolved in 300 parts by volume of tetrachlorethane and the solution is heated to a temperature of about 140° C. At this temperature 90 parts of aluminium chloride are introduced. After a short time the condensation product is decomposed by means of ice and hydrochloric acid and the solvent is distilled with aid of steam. The residue is filtered by suction, washed until neutral and dried. The properties of the cyclic ketone thus obtained are identical with those of the products obtained as described in Examples 1 and 2. Instead of tetrachloroethane, chloro-benzene may also be used as solvent.

(4) 20 parts of 1-chloro-cyanoacetylacenaphthene of one of the following formulæ:

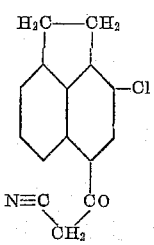 or 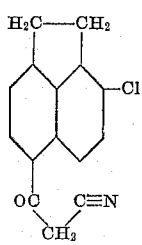

are gradually introduced at 120° C. into a suspension of 80 parts of aluminium chloride in 120 parts of dry chloro-benzene and the temperature is maintained for about 1 hour. The condensation product is decomposed by means of ice and the solvent is distilled with aid of steam. The residue is filtered with suction, washed with a solution of sodium chloride until neutral and dried. The hydrochloride of the ketimide of 1-chloroacenaphth-peri-indandion of one of the following formulæ:

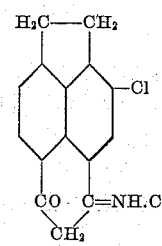 or 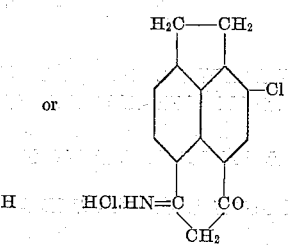

has a yellow coloration and is soluble in hot water. It dissolves in concentrated sulfuric acid to a yellow solution having a green fluorescence. It melts at above 300° C.

(5) 43 parts of cyanoacetic acid are dissolved in 100 parts by volume of tetrachloro-ethane and transformed into the acid-chloride by means of 120 parts of phosphorus pentachloride. At a temperature of 30° C. 180 parts of aluminium chloride are added to this solution which is then heated to 40° C. At this temperature 55 parts of acenaphthene are gradually entered and the whole is further heated to 45° C.–50° C. for one hour. When the evolution of hydrochloric acid is finished, the solution is heated to 130° C. and 100 parts of aluminium chloride are added, whereupon heating is continued for ¼–½ hour. The reaction mixture is decomposed with ice water and the tetrachloro-ethane is separated by distilling with steam. The cyclic ketone of the acenaphthene thus obtained may be purified by redissolving it from dilute sulfuric acid. It is then obtained in the form of its sulfate. It is identical with the product obtained according to Example 1.

We claim:

1. The process which comprises causing aluminium chloride to act upon a compound of the following formula

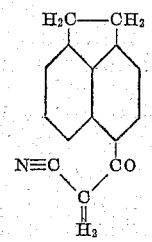

wherein the naphthalene nucleus may contain chlorine as a substituent at a temperature between about 110° C. and about 160° C.

2. The process which comprises causing aluminium chloride to act upon a compound of the following formula

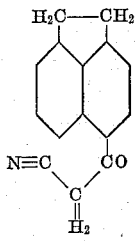

wherein the naphthalene nucelus may contain chlorine as a substituent at a temperature between about 110° C. and about 160° C. in the presence of an inert diluent.

3. The process which comprises causing aluminum chloride to act upon a compound of the following formula

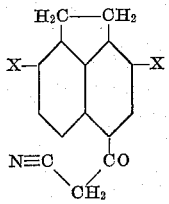

wherein one of the X's stands for hydrogen, the other X for hydrogen or chlorine at a temperature between about 110° C. and about 160° C.

4. The process which comprises causing aluminium chloride to act upon a compound of the following formula

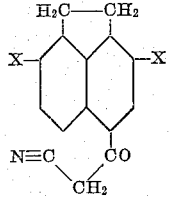

wherein one of the X's stands for hydrogen, the other X for hydrogen or chlorine, at a temperature between about 110° C. and about 160° C. in the presence of an inert organic diluent.

5. The process which comprises causing aluminium chloride to act upon 3-cyano-acetyl-acenaphthene at a temperature of about 140° C. in the presence of tetrachloroethane.

6. The process which comprises causing aluminium chloride to act upon a compound of the following formula

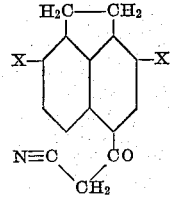

wherein one of the X's stands for hydrogen, the other X stands for chlorine, at a temperature of about 120° C. in the presence of chlorobenzene.

7. As new products, the compounds of the following probable formula

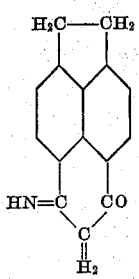

wherein the naphthalene nucleus may contain chlorine as a substituent.

8. As new products, the compounds of the following probable formula

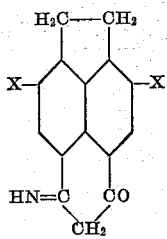

wherein one of the X's stands for hydrogen or chlorine, the other X for hydrogen, forming with hydrochloric acid yellowish salts which melt above 300° C. and dissolving in concentrated sulfuric acid to a yellow solution showing a strong green fluorescence.

9. As a new product, the compound of the following probable formula

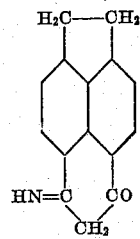

crystallizing from chloro-benzene in the form of yellow prisms yielding with hydrochloric acid an orange-yellow salt which melts above 300° C. and dissolves in hot water to a yellow solution and in concentrated sulfuric acid to a yellow solution showing a strong green fluorescence.

10. As a new product, the compound of the following probable formula

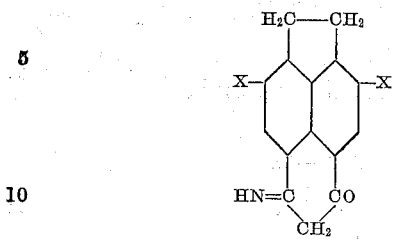

wherein one of the X's stands for chlorine, the other X stands for hydrogen, forming with hydrochloric acid a yellow salt which melts above 300°C. and dissolves in hot water and in concentrated sulfuric acid to a yellow solution showing a green fluorescence.

In testimony whereof, we affix our signatures.

WILHELM ECKERT.
HEINRICH SIEBER.
HEINRICH GREUNE.
GERHARD LANGBEIN.